US 11,452,254 B2

(12) United States Patent
Stuart et al.

(10) Patent No.: US 11,452,254 B2
(45) Date of Patent: Sep. 27, 2022

(54) DEBRIS REMOVAL SYSTEM FOR AN AGRICULTURAL METERING SYSTEM

(71) Applicant: CNH Industrial Canada, Ltd., Saskatoon (CA)

(72) Inventors: Graham Douglas Stuart, Warman (CA); Nicholas George Alfred Ryder, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 286 days.

(21) Appl. No.: 16/676,534

(22) Filed: Nov. 7, 2019

(65) Prior Publication Data
US 2021/0136998 A1    May 13, 2021

(51) Int. Cl.
*A01C 7/12* (2006.01)
*A01C 7/08* (2006.01)

(52) U.S. Cl.
CPC .............. *A01C 7/126* (2013.01); *A01C 7/082* (2013.01); *A01C 7/123* (2013.01)

(58) Field of Classification Search
CPC ........... A01C 7/081; A01C 7/082; A01C 7/12; A01C 7/123; A01C 7/126; A01C 7/042; A01C 7/044
See application file for complete search history.

(56) References Cited

U.S. PATENT DOCUMENTS

| 3,715,057 | A | * | 2/1973 | Becker | A01C 7/044 |
| | | | | | 111/179 |
| 3,954,204 | A | * | 5/1976 | Becker | A01C 7/12 |
| | | | | | 221/266 |
| 7,093,548 | B2 | | 8/2006 | Eben et al. | |
| 7,490,565 | B2 | | 2/2009 | Holly | |
| 7,938,073 | B2 | | 5/2011 | Dunham et al. | |
| 8,464,860 | B2 | * | 6/2013 | Frey | B65G 53/4633 |
| | | | | | 198/642 |
| 8,928,486 | B2 | * | 1/2015 | Hui | A01C 7/081 |
| | | | | | 340/608 |
| 9,253,940 | B2 | | 2/2016 | Wilhelmi et al. | |
| 9,801,330 | B2 | | 10/2017 | Bent et al. | |
| 9,901,024 | B2 | | 2/2018 | Zacharias et al. | |
| 10,085,375 | B2 | * | 10/2018 | Engel | A01C 7/046 |
| 10,123,524 | B2 | | 11/2018 | Roberge et al. | |

(Continued)

FOREIGN PATENT DOCUMENTS

| CA | 1275986 | | 11/1990 | |
| EP | 0140317 | * | 5/1985 | A01C 7/14 |

(Continued)

*Primary Examiner* — Thomas B Will
*Assistant Examiner* — Ian A Normile
(74) *Attorney, Agent, or Firm* — Rebecca L. Henkel; Rickard K. DeMille

(57) ABSTRACT

A meter roller for an agricultural metering system includes multiple flutes and corresponding recesses. The flutes and the corresponding recesses are configured to meter flowable particulate material from a storage tank to a material distribution system via rotation of the meter roller. The meter roller also includes multiple air passages formed within a body of the meter roller. Each air passage is fluidly coupled to a central cavity of the meter roller and extends to a base of a respective recess, and the air passage is configured to flow air from the central cavity into the respective recess.

13 Claims, 8 Drawing Sheets

(56) References Cited

U.S. PATENT DOCUMENTS

| | | | |
|---|---|---|---|
| 10,206,327 B2 | 2/2019 | Hahn et al. | |
| 2012/0067260 A1* | 3/2012 | Garner | A01C 7/12 |
| | | | 111/171 |
| 2018/0310468 A1 | 11/2018 | Schoeny et al. | |
| 2019/0098827 A1* | 4/2019 | Gilbert | A01C 7/084 |
| 2020/0208542 A1* | 7/2020 | Ahlbom | F01K 25/106 |

FOREIGN PATENT DOCUMENTS

| | | | | |
|---|---|---|---|---|
| EP | 0259633 A2 | * | 3/1988 | A01C 15/16 |
| FR | 1437984 | * | 5/1966 | A01C 7/044 |

* cited by examiner

DEBRIS REMOVAL SYSTEM FOR AN AGRICULTURAL METERING SYSTEM

BACKGROUND

The disclosure relates generally to a debris removal system for an agricultural metering system.

Generally, seeding implements (e.g., seeders) are towed behind a tractor or other work vehicle via a mounting bracket secured to a rigid frame of the implement. Seeding implements typically include multiple row units distributed across a width of the implement. Each row unit is configured to deposit seeds at a target depth beneath the soil surface of a field, thereby establishing rows of planted seeds. For example, each row unit typically includes a ground engaging tool or opener that forms a seeding path (e.g., trench) for seed deposition into the soil. A seed tube (e.g., coupled to the opener) is configured to deposit seeds and/or other agricultural products (e.g., fertilizer) into the trench. The opener/seed tube may be followed by closing discs that move displaced soil back into the trench and/or a packer wheel that packs the soil on top of the deposited seeds.

In certain configurations, an air cart is used to meter and deliver flowable particulate material (e.g., agricultural product, such as seeds, fertilizer, etc.) to the row units of the seeding implement. The air cart generally includes a storage tank (e.g., a pressurized tank), an air source (e.g., a blower), and a metering system. The flowable particulate material is typically gravity fed from the storage tank to the metering system which distributes the flowable particulate material into an airflow generated by the air source. The airflow carries the flowable particulate material to the row units via conduits extending between the air cart and the seeding implement.

The metering system typically includes meter rollers that control the flow of the flowable particulate material based on geometry and rotation rate of the meter rollers. Each meter roller includes multiple flutes and corresponding recesses. During operation of the metering system, each recess of the meter roller receives the flowable particulate material from the storage tank and delivers the flowable particulate material into the airflow via rotation of the meter roller. Unfortunately, the flowable particulate material and/or other particulate matter (e.g., dust, dirt, etc.) may accumulate within one or more recesses (e.g., due to adhesion of the flowable particulate material/particulate matter to the meter roller), thereby reducing the volume of the one or more recesses. As a result, the flow rate of the particulate material through the metering system may be reduced, which may reduce the accuracy of particulate material distribution throughout the field.

BRIEF DESCRIPTION

In certain embodiments, a meter roller for an agricultural metering system includes multiple flutes and corresponding recesses. The flutes and the corresponding recesses are configured to meter flowable particulate material from a storage tank to a material distribution system via rotation of the meter roller. The meter roller also includes multiple air passages formed within a body of the meter roller. Each air passage is fluidly coupled to a central cavity of the meter roller and extends to a base of a respective recess, and the air passage is configured to flow air from the central cavity into the respective recess.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
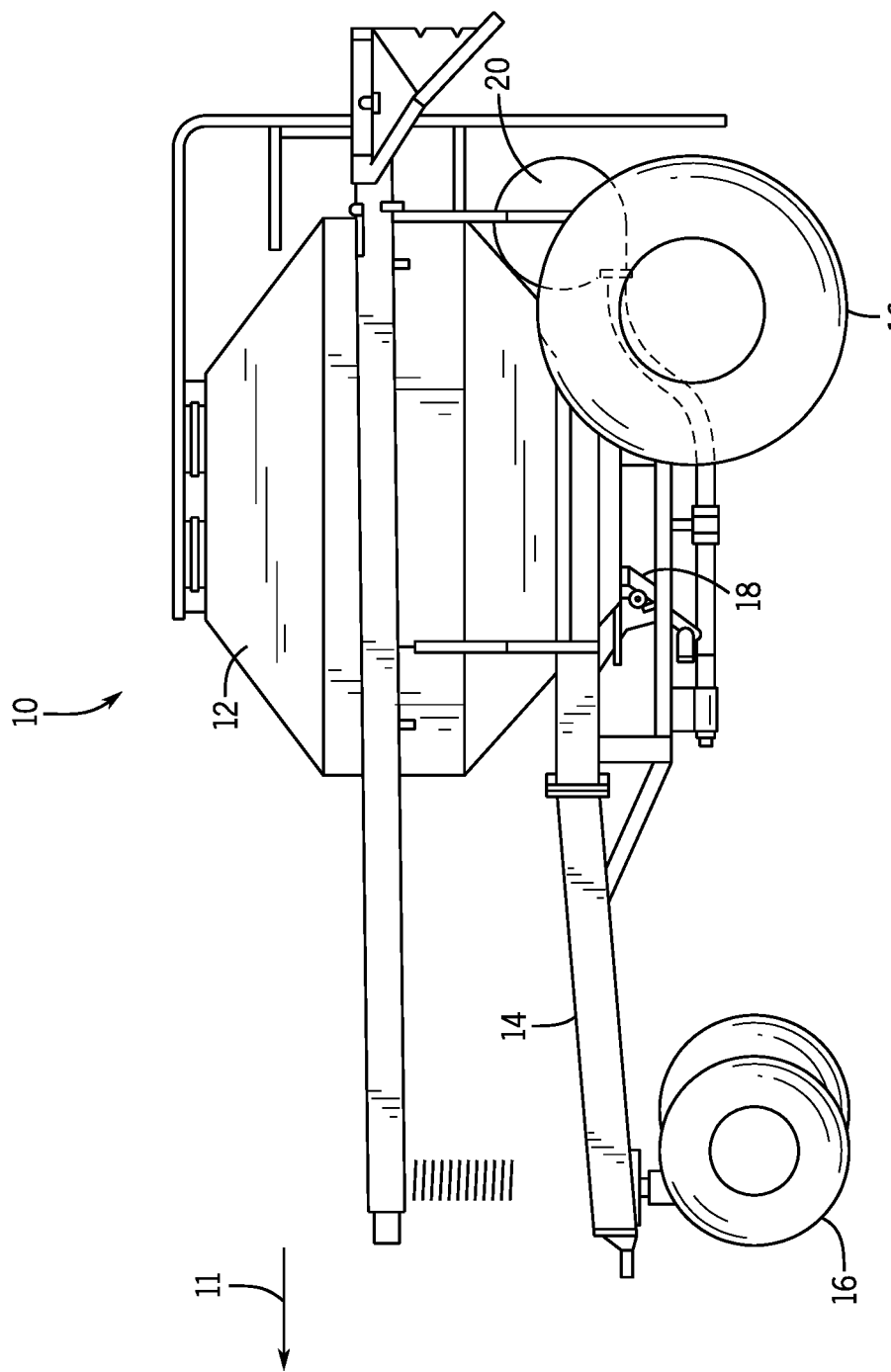
FIG. 1 is a side view of an embodiment of an air cart, including a metering system configured to control a flow of particulate material.

FIG. 1 is a side view of an embodiment of an air cart 10 that may be used in conjunction with a towable agricultural implement to deposit seeds into soil. For example, certain agricultural implements include row units configured to open the soil, dispense seeds into the soil opening, and re-close the soil. Such implements are generally coupled to a tow vehicle, such as a tractor, and pulled through a field. In certain configurations, seeds are conveyed to the row units by the illustrated air cart 10, which is generally towed in sequence with the implement along a direction of travel 11 (e.g., behind the implement or in front of the implement).

In certain configurations, the air cart 10 may be configured to provide fertilizer to the row units, or a combination of seeds and fertilizer.

In the illustrated embodiment, the air cart 10 includes a storage tank 12, a frame 14, wheels 16, a metering system 18, and an air source 20. In certain configurations, the storage tank 12 includes multiple compartments for storing various flowable particulate materials (e.g. agricultural products, such as seeds and/or dry fertilizer). For example, one compartment may include seeds, such as canola or mustard, and another compartment may include a dry fertilizer. In such configurations, the air cart 10 is configured to deliver both the seeds and fertilizer to the implement. The frame 14 includes a towing hitch configured to couple to the implement or tow vehicle. As discussed in detail below, the flowable particulate material (e.g., seeds and/or fertilizer) within the storage tank 12 are gravity fed into the metering system 18. The metering system 18 includes one or more meter rollers that control the flow of the particulate material from the storage tank 12 into an airflow provided by the air source 20. The airflow then carries the flowable particulate material to the implement by pneumatic conduits. In this manner, the row units receive a supply of the particulate material (e.g., seeds and/or fertilizer) for deposition within the soil.

Figure 2:
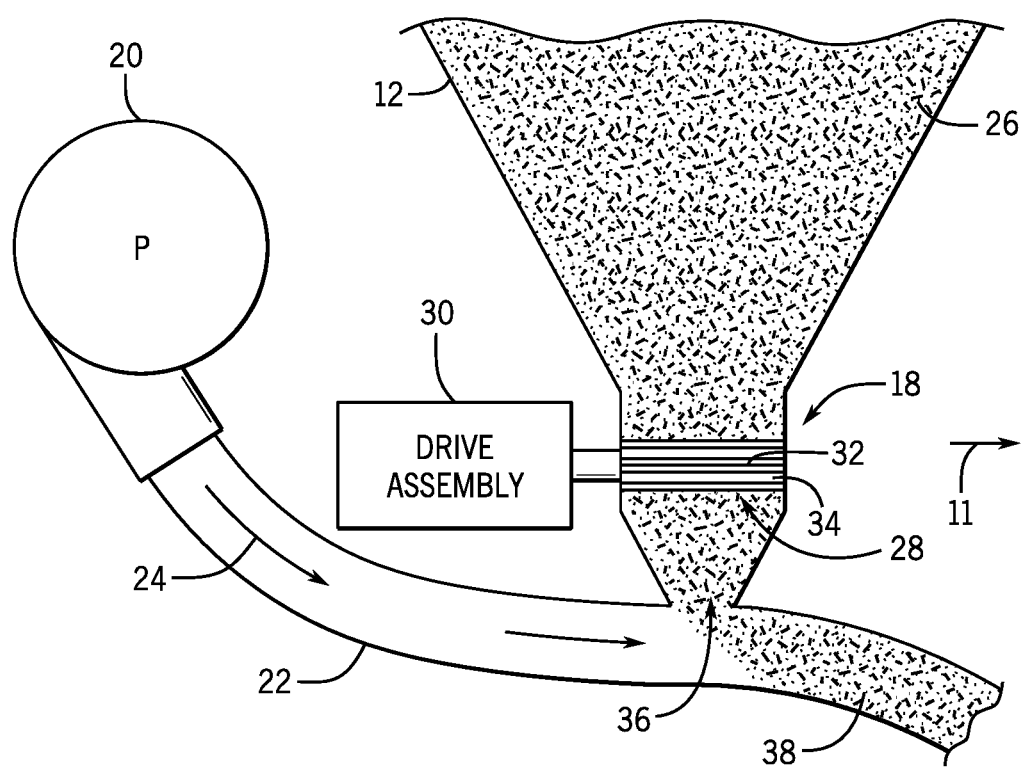
FIG. 2 is a schematic view of an embodiment of a metering system that may be employed within the air cart of FIG. 1.

FIG. 2 is a schematic view of an embodiment of a metering system 18 (e.g., agricultural metering system) that may be employed within the air cart of FIG. 1. As illustrated, the air source 20 is coupled to a conduit 22 configured to flow air 24 past the metering system 18. The air source 20 may be a pump or blower powered by an electric or hydraulic motor, for example. Flowable particulate material 26 (e.g., seeds, fertilizer, other products, etc.) within the storage tank 12 flows under the influence of gravity into the metering system 18. In certain embodiments, the storage tank 12 is pressurized such that a static pressure in the tank 12 is greater than a static pressure in the conduit 22, thereby facilitating an even flow of the particulate material through the metering system 18. The metering system 18 includes one or more meter rollers 28 configured to control the flow of the particulate material 26 into the airflow 24. In certain embodiments, the metering system 18 may include multiple meter rollers 28 (e.g., housed within individual meter boxes) disposed adjacent to one another. For example, certain metering systems may include twelve meter rollers, each housed within an individual meter box and each configured to flow particulate material into a respective conduit 22 (e.g., of a material distribution system) for distribution to one or more respective row units of the agricultural implement. In further embodiments, the metering system may include more or fewer meter rollers, e.g., 1, 2, 3, 4, 5, 6, 7, 8, 9, 10, 11, 13, or more. By independently adjusting the rotation speed of each meter roller, flow of the particular material to different portions of the implement may be particularly controlled.

In the illustrated embodiment, the meter roller 28 is coupled to a drive assembly 30 configured to drive the meter roller 28 to rotate. In certain embodiments, the drive assembly 30 includes at least one drive unit, such as an electric or hydraulic motor, configured to drive one or more meter rollers to rotate. For example, in certain embodiments, multiple drive units may be coupled to respective meter rollers to facilitate independent control of the rotation rates of the meter rollers. In further embodiments, the drive assembly 30 may be coupled to a wheel (e.g., via a gear assembly) such that rotation of the wheel drives the meter roller 28 to rotate. Such a configuration automatically varies the rotation rate of the meter roller 28 based on the speed of the air cart.

As used herein, "meter roller" refers to a structure/device having multiple flutes 32 and corresponding recesses 34, in which the flutes and corresponding recesses are configured to meter flowable particular material via rotation of the meter roller 28. As illustrated, each recess 34 is disposed between a respective pair of flutes 32. As the meter roller 28 rotates, the respective pair of flutes 32 moves the flowable particulate material 26 (e.g., agricultural product) disposed within the respective recess 34 downwardly, thereby transferring the flowable particulate material 26 to the conduit 22. The number and geometry of the flutes are particularly configured to accommodate the particulate material being distributed. Certain meter rollers may include six flutes and a corresponding number of recesses. Other meter rollers may include more or fewer flutes and/or recesses. For example, the meter roller may include 1, 2, 3, 4, 5, 6, 7, 8, 9, 10, 11, 12, 13, 14, 15, 16, 17, 18, 19, 20, or more flutes and/or recesses. In addition, the depth of the recesses and/or the height of the flutes is configured to accommodate the particulate material within the storage tank. For example, a meter roller having deeper recesses and fewer flutes may be employed for larger seeds, while a meter roller having shallower recesses and more flutes may be employed for smaller seeds. Other parameters, such as flute pitch (i.e., angle of the flute relative to a longitudinal/rotational axis of the meter roller) and flute angle (i.e., angle of the flute relative to a radial axis of the meter roller), may also be particularly selected to accommodate the flowable particulate material.

In the illustrated embodiment, the rotational axis of the meter roller 28 is oriented substantially parallel to the direction of travel 11 of the air cart. As used herein, substantially parallel may refer to an angle of about 0 to about 45 degrees, about 0 to about 30 degrees, about 0 to about 15 degrees, about 0 to about 5 degrees, or about 0 to about 1 degree relative to an axis/direction (e.g., the direction of travel 11). By way of example, substantially parallel may refer to an angle less than 5 degrees, less than 4 degrees, less than 3 degrees, less than 2 degrees, less than 1 degree, or less than 0.5 degrees relative to an axis/direction. In further embodiments, the meter roller may be oriented substantially perpendicular to the direction of travel, or at any other suitable angle.

For a particular meter roller configuration/profile, the rotation rate of the meter roller 28 controls the flow of the particulate material 26 into the airflow 24. For example, as the meter roller 28 rotates, the meter roller transfers the particulate material through an opening 36 in the metering system 18 into a respective conduit 22 (e.g., into a conduit associated with a respective row unit or group of row units). The particulate material then mixes with air from the air source 20, thereby forming an air/material mixture 38. The mixture then flows to the respective row unit(s) of the implement via pneumatic conduit(s), where the flowable particulate material (e.g., seeds and/or fertilizer) are deposited within the soil.

Different flowable particulate materials may include particles of different sizes. For example, seeds, such as sunflower, may have a coarse particle size, fertilizer, such as monoammonium phosphate (MAP), may have a medium particle size, and inoculant, such as a granular microbial soil inoculant, may have a fine particle size. Moreover, the target application rate may vary based on the type of flowable particulate material being dispensed. For example, the target flow rate of certain seeds or fertilizers may be higher than the target flow rate of other seeds or fertilizers. Accordingly, certain embodiments of the metering system disclosed herein may facilitate removal and replacement of meter rollers, thereby enabling an operator to select a meter roller suitable for a particular flowable particulate material and for a target dispensing rate (e.g., a target rate for particular field conditions, climate, expected yield, etc.).

As discussed in detail below, the metering system may include a debris removal system configured to substantially reduce accumulation of debris within the recesses of the meter roller, thereby enabling the meter roller to accurately control the flow of the particular material to the respective conduit. For example, in certain embodiments, the debris removal system includes one or more air passages extending to a metering cavity of the metering system. The air passage(s) may be directed toward a recess of the meter roller. For example, at least one air passage may extend through a housing of the metering system and be directed to the recess of the meter roller, and/or at least one air passage may extend through a body of the meter roller (e.g., from a central cavity of the meter roller to a base of the recess) and be directed toward the recess of the meter roller. The debris removal system may also include a valve assembly fluidly coupled to the air passage(s) and configured to control an airflow through the air passages. Furthermore, the debris removal system may include a controller communicatively coupled to the valve assembly and configured to output an output signal to the valve assembly indicative of instructions to selectively provide the airflow to the air passage(s). Selectively flowing air (e.g., air pulses) through the air passage(s) may dislodge flowable particulate material and/or other particulate matter (e.g., dust, dirt, etc.) within the recess. As a result, the volume of the recess may be substantially maintained, thereby enabling the meter roller to accurately meter the particulate material to the respective conduit.

Figure 3:
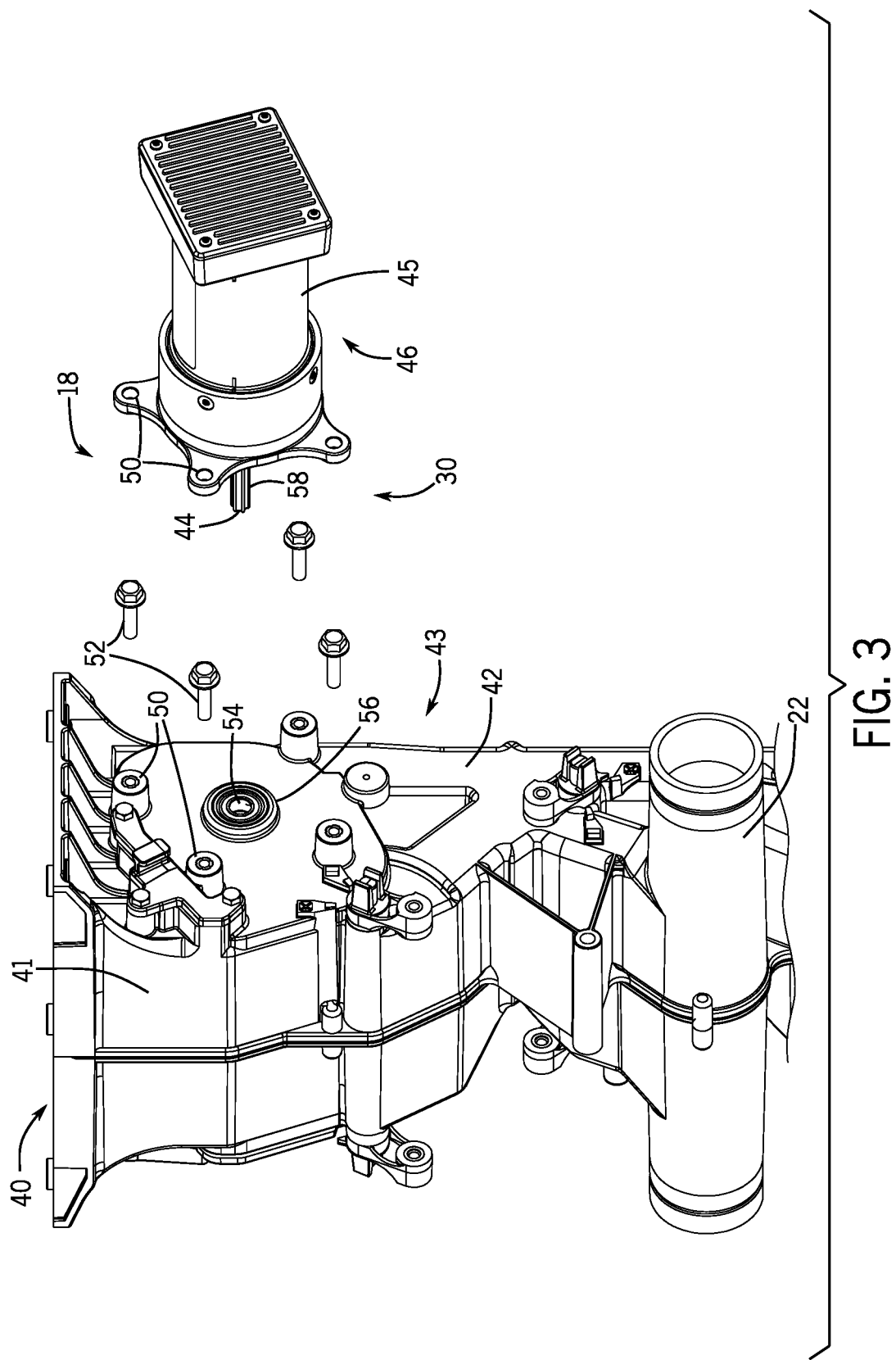
FIG. 3 is an exploded perspective view of an embodiment of a metering system that may be employed within the air cart of FIG. 1.

FIG. 3 is an exploded perspective view of an embodiment of a metering system 18 that may be employed within the air cart of FIG. 1. The metering system 18 includes a meter box 40 and a drive assembly 30. The meter box 40 has a housing 41 configured to house the meter roller and a passage 42 configured to direct the flowable particulate material from the meter roller to the conduit 22 for transfer to a row unit or group of row units. As shown in FIG. 3, the meter box 40 has a first side 43 (e.g., drive side) for receiving a drive unit 46 of the drive assembly 30. In the illustrated embodiment, the drive unit 46 includes a drive shaft 44 and a motor 45 (e.g., electric motor) that drives the drive shaft to rotate in a clockwise or counter-clockwise direction. The drive unit 46 and the meter box 40 include apertures 50 configured to receive fasteners (e.g., bolts) 52 to secure the drive unit 46 to the meter box 40. The drive shaft 44 is inserted into an opening 54 in the meter box such that the drive shaft 44 engages the meter roller within the housing 41. The drive shaft 44 is configured to drive the meter roller to rotate. A bearing (e.g., ball bearing) 56 facilitates rotation of the drive shaft 44 and meter roller within the housing 41. As the conduit 22 transfers air under the passage 42, the motor 45 (e.g., electric motor) of the drive unit 46 drives the drive shaft 44 to rotate the meter roller. As the meter roller rotates, the meter roller dispenses flowable particulate material via the passage 42 to the airflow within the conduit 22 to form the air/material mixture. Further, pressurized air from the tank may flow through the passage 42 with the particulate material from the meter roller.

In the illustrated embodiment, the drive shaft 44 includes a first engagement feature 58, such as protrusions, configured to non-rotatably couple the drive shaft 44 to the meter roller. The protrusions may engage corresponding recesses of the meter roller, thereby non-rotatably coupling the drive shaft 44 to the meter roller. While the drive unit 46 includes an electric motor in the illustrated embodiment, in alternative embodiments, the drive unit may include any other suitable system configured to drive rotation of the meter roller, such as a hydraulic motor, a pneumatic motor, or a gear assembly coupled to a wheel of the air cart.

Figure 4:
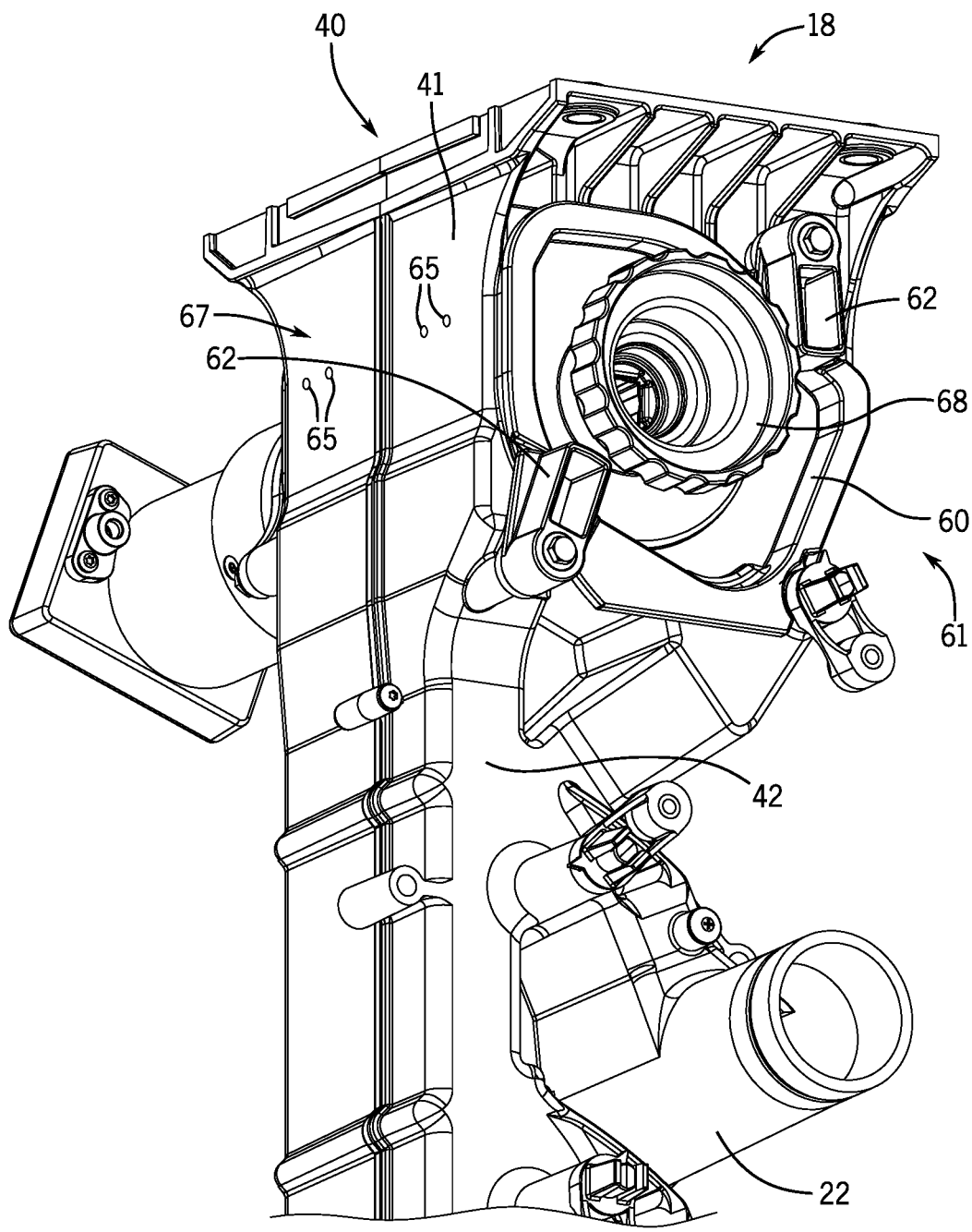
FIG. 4 is a perspective view of the metering system of FIG. 3, in which a cartridge is disposed within a meter box, and air passages of a debris removal system extend through a housing of the meter box.

FIG. 4 is a perspective view of the metering system 18 of FIG. 3, in which a cartridge 60 is disposed within the meter box 40, and air passages 65 of a debris removal system 67 extend through the housing 41 of the meter box 40. As discussed in detail below, the cartridge 60 (e.g., meter roller cartridge, modular meter roller cartridge) is configured to facilitate removal and installation of the meter roller via a meter box opening on a second side 61 (e.g., cartridge side) of the meter box 40. As illustrated, the housing 41 of the meter box 40 houses the cartridge 60 while the cartridge is disposed within a metering cavity of the meter box housing 41. While the cartridge 60 is housed within the meter box 40 of the metering system 18 in the illustrated embodiment, in alternative embodiments, the meter box may house a meter roller without a cartridge, or the meter box may house multiple cartridges (e.g., 2, 3, 4, 5, 6, or more).

In the illustrated embodiment, the metering system 18 is configured to enable the cartridge 60 to engage the meter box 40 via the meter box opening in the second side 61 (e.g., cartridge side) of the meter box 40. While the cartridge 60 is engaged with the meter box 40, the shaft of the drive unit engages the meter roller, thereby enabling the meter roller to be driven in rotation. As previously discussed, rotation of the meter roller drives the particulate material to flow into the passage 42. The cartridge 60 has a cross-sectional shape that substantially corresponds to the cross-sectional shape of the meter box opening and the metering cavity. As illustrated, the meter box 40 includes two cartridge locking tabs 62 configured to selectively block removal of the cartridge 60 from the meter box 40, thereby retaining the cartridge 60 within the meter box 40. In the illustrated embodiment, each locking tab 62 is part of a rotatable latch configured to rotate between the illustrated locked position that blocks removal of the cartridge 60 from the meter box 40 and an unlocked position that facilitates removal of the cartridge 60 from the meter box 40. In certain embodiments, each cartridge locking tab includes a recess that engages a corresponding notch on the cartridge 60 to block unintentional rotation of the rotatable latch while the rotatable latch is in the locked position (e.g., due to vibrations of the air cart).

The cartridge 60 may be removed by rotating each rotatable latch in a respective first direction and extracting the cartridge 60. Further, the cartridge 60 may be inserted by engaging the cartridge with the meter box 40, and then rotating each latch in a respective second direction, opposite the respective first direction. While each cartridge locking tab 62 is part of a rotatable latch in the illustrated embodiment, in alternative embodiments, the cartridge locking tab may be part of a spring latch, a bolt latch, or any suitable type of locking mechanism. Furthermore, while the illustrated meter box includes two locking tabs, in alternative embodiments, the meter box may include more or fewer locking tabs (e.g., 1, 2, 3, 4, etc.). In the illustrated embodiment, the cartridge 60 includes a releasable bearing coupler 68. As discussed in detail below, the releasable bearing coupler 68 retains the meter roller within the cartridge, facilitates rotation of the meter roller within the cartridge, and facilitates removal of the meter roller from the cartridge.

In the illustrated embodiment, the debris removal system 67 includes air passages 65 that extend through the housing 41 of the meter box 40. Each air passage is directed toward a recess of the meter roller. Accordingly, airflow through the air passages 65 may dislodge debris accumulated within one or more recesses of the meter roller, thereby enabling the meter roller to accurately meter the flowable particulate material to the conduit 22. The airflow may be provided to the air passages 65 by an air source (e.g., the air source of the material distribution system or a separate air source) via conduits. While the debris removal system 67 includes four air passages 65 in the illustrated embodiment, in other embodiments, the debris removal system may include more or fewer air passages (e.g., 0, 1, 2, 3, 4, 5, 6, 7, 8, 9, 10, or more) extending through the housing. For example, in certain embodiments, the debris removal system may not include any air passages extending through the housing of the meter box. In addition, while the air passages are arranged along an axis substantially parallel to the rotational axis of the meter roller in the illustrated embodiment, in other embodiments, the air passages may be arranged in any suitable configuration on the housing, such that each air passage is directed toward a recess of the meter roller. Furthermore, while the air passages are positioned on a single side of the meter box housing in the illustrated embodiment, in other embodiments, one or more air passages may be positioned in other suitable location(s) on the housing, such that each air passage is directed toward a recess of the meter roller.

Figure 5:
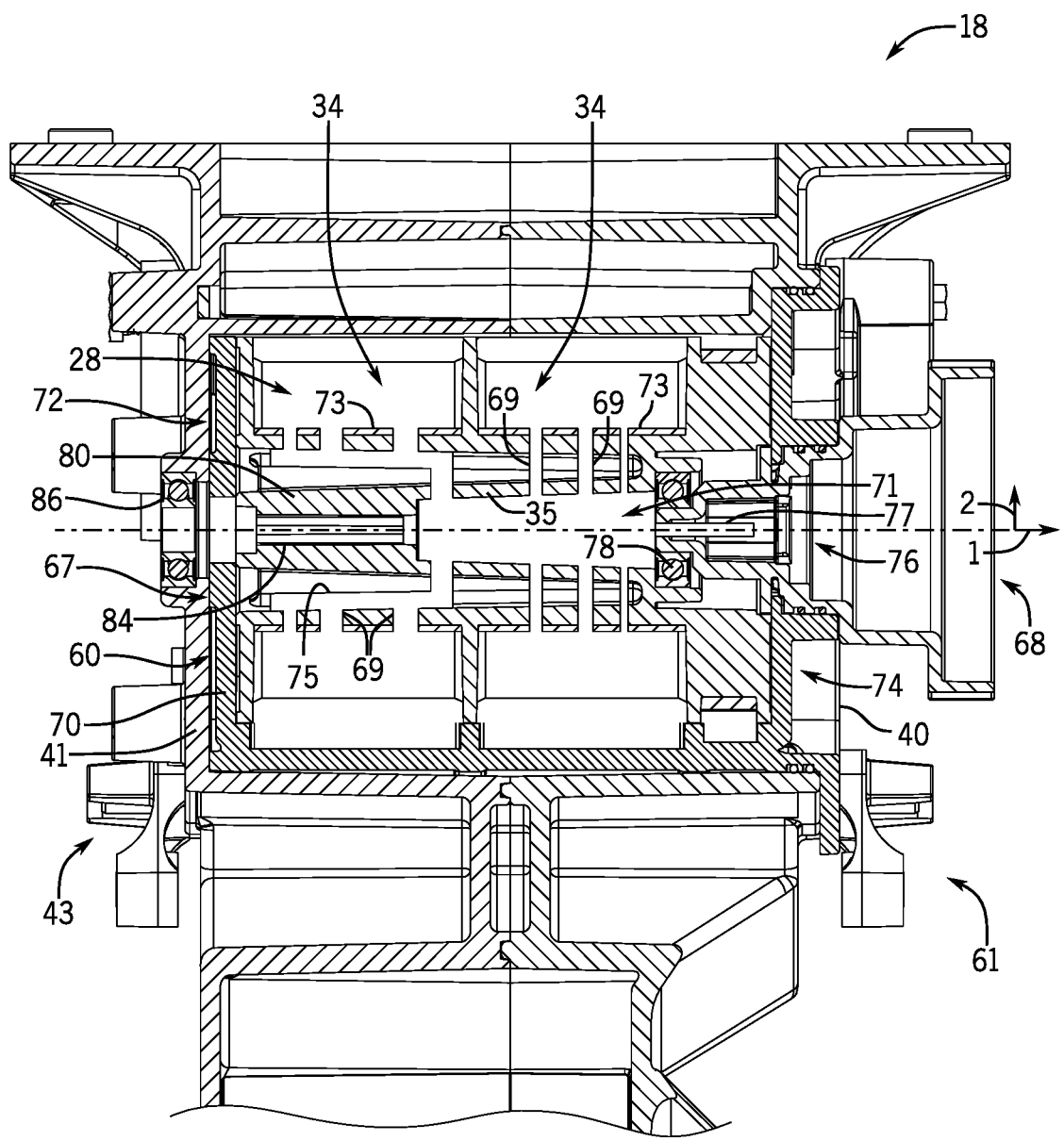
FIG. 5 is a cross-sectional view of the metering system of FIG. 3, in which air passages of the debris removal system extend through a body of a meter roller.

FIG. 5 is a cross-sectional view of the metering system 18 of FIG. 3, in which air passages 69 of the debris removal system 67 extend through a body 35 of the meter roller 28. As illustrated, the cartridge 60 is engaged with/disposed within the housing 41 of the meter box 40. The cartridge 60 includes a housing 70 configured to rotatably support the meter roller 28 within the meter box housing 41 (e.g., the housing 70 is secured to the meter box housing 41 while the meter roller 28 rotates). The housing 70 includes a first side 72 (e.g., cartridge drive side) and a second side 74 (e.g., cartridge bearing side), which correspond to the first side 43 and second side 61 of the meter box 40, respectively.

The cartridge 60 includes a bearing opening 76 for receiving the releasable bearing coupler 68, and in certain embodiments, a meter roller bearing 78, which may engage the meter roller 28. The meter roller 28 includes a driven shaft 80 configured to engage the drive shaft of the drive unit, thereby non-rotatably coupling the drive shaft to the meter roller. The driven shaft 80 includes a second engagement feature 84 (e.g., recesses) configured to selectively engage the first engagement feature (e.g., protrusions) of the drive shaft. While the second engagement feature includes recesses in the illustrated embodiment, in alternative embodiments, the second engagement feature may include a cavity having a polygonal cross-section and configured to engage the drive shaft having a corresponding polygonal cross-section (e.g., first engagement feature). Furthermore, while the illustrated second engagement feature 84 facilities shape-based engagement with the first engagement feature, in alternative embodiments, any variety of suitable interlocking mechanisms may be utilized for non-rotatably coupling the meter roller to the drive shaft.

In the illustrated embodiment, a drive bearing 86 is used to facilitate rotation of the drive shaft within the meter box. The drive bearing 86, the driven shaft 80, the drive shaft, and the meter roller bearing 78 associated with the releasable bearing coupler 68 are in longitudinal alignment, thereby facilitating rotation of the meter roller 28 in response to rotation of the drive shaft. The meter roller bearing 78 may be coupled to the releasable bearing coupler 68, the driven shaft 80, or it may be a separate individual element. While the cartridge 60 is engaged with/disposed within the meter box housing 41, the cartridge housing 70 rotatably supports/ houses the meter roller 28. To change a meter roller 28, the operator may remove the cartridge 60, replace the meter roller 28, and then reinstall the cartridge 60. Alternatively, the operator may remove the cartridge 60 and replace the cartridge with another cartridge that contains a different meter roller or with a different cartridge type.

In the illustrated embodiment, the debris removal system 67 includes air passages 69 formed within the body 35 (e.g., including the driven shaft 80) of the meter roller 28. Each air passage 69 is fluidly coupled to a central cavity 71 of the meter roller 28 and extends to a base 73 of a respective/corresponding recess 34. As used herein, "central cavity" refers to a void (e.g., passage) within the body 35 of the meter roller 28 (e.g., positioned along a longitudinal axis/rotational axis 1 of the meter roller 28), regardless of the size of the void. As illustrated, certain air passages 69 extend directly from the central cavity 71 to the base 73 of the respective recess 34 (e.g., along a radial axis 2 of the meter roller 28), and other air passages 69 are fluidly coupled to an intermediate fluid path 75 extending between the central cavity 71 and the air passages 69. The fluid pathway between the central cavity 71 and each air passage 69 may be arranged based on the configuration of the meter roller (e.g., one or more intermediate fluid paths may establish the fluid connection between the central cavity and air passage(s) that are offset from the central cavity along the longitudinal axis/rotational axis of the meter roller). Each air passage 69 is directed toward the recess along the radial axis 2 to establish an airflow from the central cavity 71 into the respective recess. The airflow from the air passages may dislodge debris accumulated within the recesses, thereby enabling the meter roller to accurately meter the flowable particulate material to the conduit.

In the illustrated embodiment, the debris removal system 67 includes three air passages 69 extending to the base 73 of each recess 34 of the meter roller 28. However, in other embodiments, more or fewer air passages (0, 1, 2, 3, 4, 5, 6, 7, 8, 9, 10, or more) may extend to at least one of the recesses (e.g., such that a first number of air passages extend to the base of a first recess and a different number of air passages extend to the base of a second recess). For example, in certain embodiments, no air passages may extend to the base of at least one recess. Furthermore, in the illustrated embodiment, each air passage is oriented substantially along the radial axis of the meter roller. However, in other embodiments, at least one air passage may be oriented at a suitable angle relative to the radial axis (e.g., about 5 degrees, about 10 degrees, about 15 degrees, about 20 degrees, about 30 degrees, etc.). Having multiple air passages extending to the base of a recess and orientated at different angles may further facilitate debris removal from the recess. In addition, while each air passage 69 extends to the base 73 of a respective recess 34 in the illustrated embodiment, in other embodiments, at least one air passage may extend through a flute to the respective recess. For example, one or more air passages may extend through flute(s) positioned directly adjacent to the recess, and the air passage(s) may be directed toward the recess to facilitate debris removal from the recess.

In the illustrated embodiment, the debris removal system 67 includes an inlet 77 fluidly coupled to the central cavity 71 and configured to flow air into the central cavity 71. The inlet 77 may be fluidly coupled to a conduit that provides air from the air source to the central cavity 71, thereby facilitating airflow to the air passages 69. In the illustrated embodiment, the inlet 77 is substantially coaxial with the longitudinal axis/rotational axis 1 of the meter roller 28 (e.g., the flow path of air through the inlet 77 is coaxial with the longitudinal axis/rotational axis 1 of the meter roller 28). However, in other embodiments, the inlet may be offset (e.g., along the radial axis 2) from the longitudinal axis/rotational axis of the meter roller and/or angled relative to the longitudinal axis/rotational axis of the meter roller. In the illustrated embodiment, the inlet 77 is integrally formed with the releasable bearing coupler 68. Accordingly, the inlet 77 remains stationary (i.e., does not rotate) relative to the meter box housing 41 during operation of the metering system 18. However, in other embodiments, the inlet may be formed separately and coupled to the releasable bearing coupler, or the inlet may be integrally formed with/coupled to another suitable element of the metering system (e.g., the meter box housing, the meter cartridge housing, etc.). Furthermore, in certain embodiments, the inlet may be coupled to the meter roller (e.g., such that the inlet rotates with the meter roller). While a single inlet provide air to the central cavity of the meter roller in the illustrated embodiment, in other embodiments, multiple inlets may be fluidly coupled to the central cavity.

Figure 6:
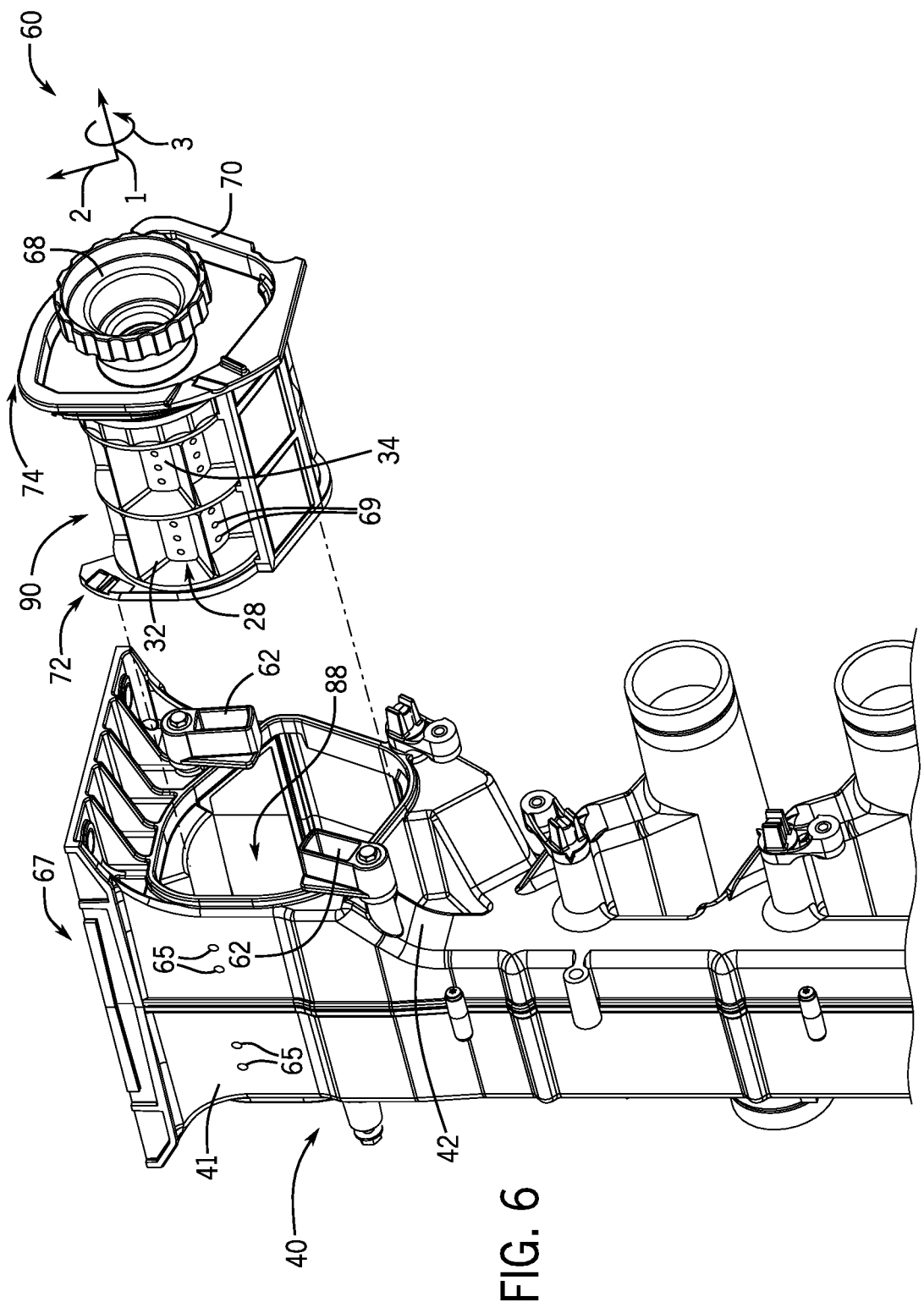
FIG. 6 is a perspective view of the metering system of FIG. 3, in which the cartridge is removed from the meter box.

FIG. 6 is a perspective view of the metering system of FIG. 3, in which the cartridge 60 is removed from the meter box 40. To remove the cartridge 60, the operator may rotate the rotatable latches to the unlocked position, in which the locking tabs 62 are positioned to facilitate removal of the cartridge, and extract the cartridge 60 from the meter box 40. As illustrated, the cross-sectional shape of the cartridge 60 (e.g., the cross-sectional shape of the first side 72, the cross-sectional shape of the second side 74, etc.) substantially correspond to the cross-sectional shape of the metering cavity 88 of the meter box housing 41.

As illustrated, the meter roller 28 includes flutes 32 and recesses 34, which are configured to enable the meter roller 28 to control the flow of the flowable particulate material into the passage 42. The meter roller 28 is rotatably supported on the second side 74 of the meter roller cartridge 60 by the releasable bearing coupler 68. Once the cartridge 60 is removed from the meter box 40, the releasable bearing coupler 68 may be disengaged and removed from the meter roller/cartridge housing. Once the rotatable bearing coupler 68 is removed, the meter roller 28 may be removed through an opening 90, thereby enabling insertion of another meter roller (e.g., suitable for use with material having a larger or small particle size, and/or for a higher or lower target application rate).

As previously discussed, air passages 65 extend through the housing 41 of the meter box 40 and are directed toward recesses 34 of the meter roller 28. In addition, air passages 69 extend through the body of the meter roller 28 and are directed toward the recesses 34 of the meter roller. Each air passage is configured to flow air into a respective/corresponding recess to remove accumulated debris within the recess, thereby enabling the meter roller to accurately meter the flowable particulate material. In the illustrated embodiment, the air passages 69 extending to the base of each recess are arranged along the longitudinal axis/rotational axis 1 of the meter roller 28. However, in other embodiments, the air passages extending to the base of at least one recess may be arranged in another suitable configuration. For example, at least one air passage may be offset from at least one other air passage along a circumferential axis 3 of the meter roller. Furthermore, while air passages extend to the base of each recess of the meter roller in the illustrated embodiment, in other embodiments, an air passage may not extend to the base of at least one recess.

While the debris removal system 67 includes air passages 65 extending through the housing 41 of the meter box 40 and air passages 69 extending through the body of the meter roller 28 in the illustrated embodiment, in other embodiments, the debris removal system may only include air passages extending through the meter box housing, or the debris removal system may only include air passages extending through the meter roller body. Furthermore, in certain embodiments, air passage(s) may extend through another suitable housing of the metering system (e.g., alone or in combination with the air passages extending through the meter box housing and/or the air passages extending through the meter roller body), such as the housing 70 of the cartridge 60. For example, one or more air passage may extend through the cartridge housing 70 and be directed toward one or more respective recesses. The air passage(s) extending through the cartridge housing may receive air from corresponding passage(s) within the meter box housing (e.g., the air passage(s) within the cartridge housing may align with the passage(s) extending through the meter box housing while the cartridge is disposed within the meter box).

Figure 7:
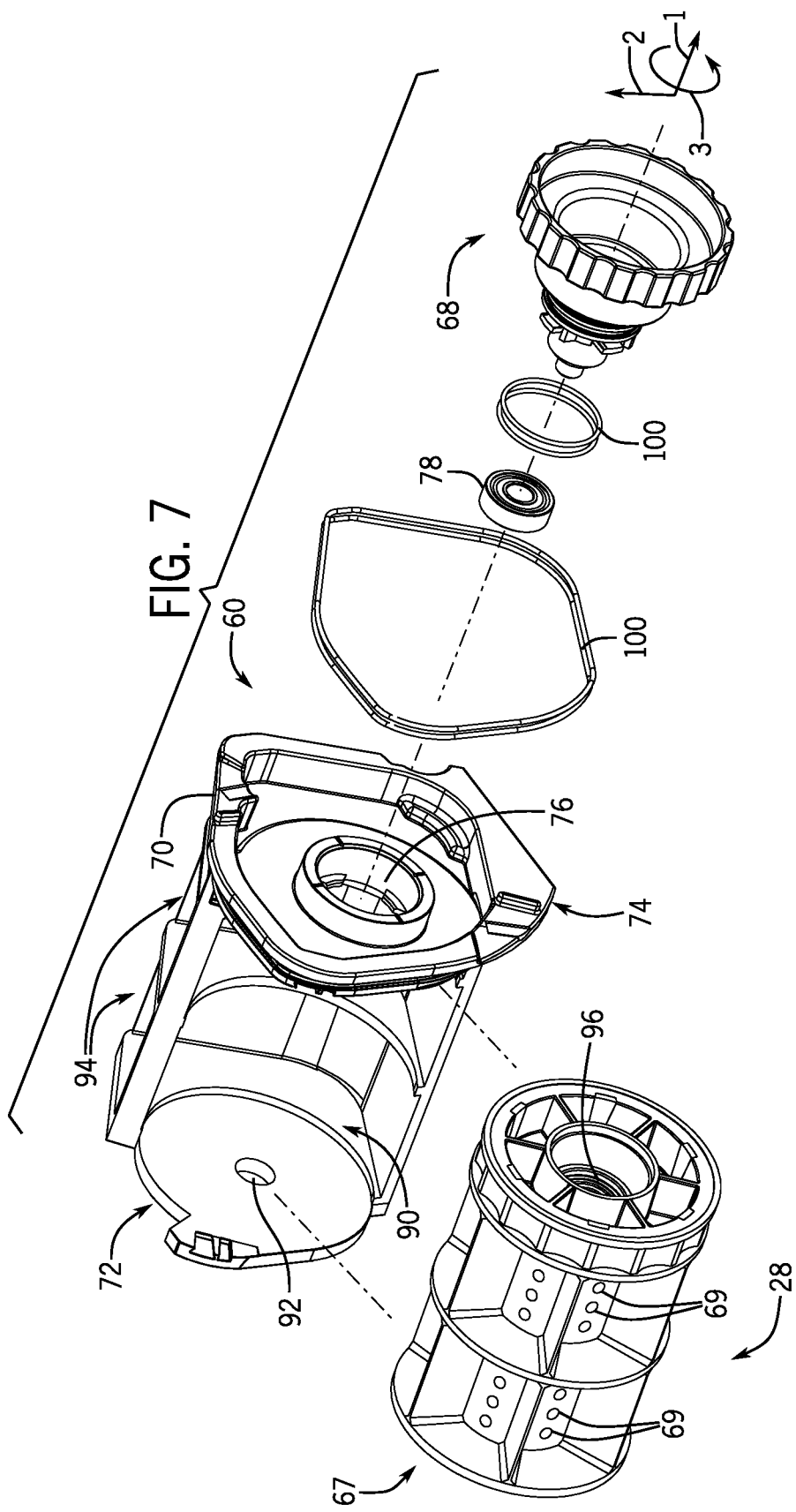
FIG. 7 is an exploded perspective view of the cartridge of FIG. 4, in which the meter roller is removed from a housing of the cartridge.

FIG. 7 is an exploded perspective view of the cartridge 60 of FIG. 4, in which the meter roller 28 is removed from the housing 70 of the cartridge 60. The housing 70 of the cartridge 60 has a drive shaft opening 92 on the first side 72 of the housing 70 and the bearing opening 76 on the second side 74 of the housing 70. The housing 70 also has the meter roller opening 90 and material receiving openings 94. The material receiving openings 94 are configured to receive the flowable particulate material into the housing 70, thereby enabling the meter roller 28 to receive the material.

To couple the meter roller 28 to the housing 70, the meter roller 28 is disposed within the housing 70 through the meter roller opening 90. While the meter roller 28 is disposed within the housing 70, the drive shaft opening 92 on the first side 72 of the housing 70 aligns with the drive shaft opening (e.g., a recess or interior cavity) of the driven shaft. In addition, the bearing opening 76 on the second side 74 of the housing 70 aligns with a bearing opening 96 (e.g., a recess or interior cavity) of the meter roller 28. The bearing opening 96 may be configured to receive the bearing 78 or the bearing may be fixedly mounted within the opening 96. The openings of the meter roller 28 and cartridge 60 are longitudinally aligned with one another and with the drive shaft.

The meter roller cartridge 60 and/or the releasable bearing coupler 68 may include gaskets 100. While two gaskets 100 (e.g., O-rings) are included in the illustrated embodiment, in alternative embodiments, any suitable number of gaskets (e.g., O-rings) may be used to seal adjacent parts. Once the meter roller 28 is disposed within the housing 70, the bearing opening 96 may receive the releasable bearing coupler 68, and in certain embodiments the meter roller bearing 78, via the bearing opening 76 in the housing 70. The meter roller bearing 78 may be fixedly coupled to the meter roller 28 or fixedly coupled to the releasable bearing coupler 68 in certain embodiments. In further embodiments, the meter roller bearing 78 may be an independent element. The releasable bearing coupler 68 may include the bearing 78, or the releasable bearing coupler 68 may be configured to engage the bearing 78 with a shaft of the releasable bearing coupler 68. Accordingly, the bearing 78 may be configured to engage the opening 96 of the meter roller 28 to facilitate rotation of the meter roller 28 relative to the housing 70 (e.g., rotation about the shaft of the releasable bearing coupler). The bearing coupler 68 is configured to engage the bearing opening 76 and to couple to the housing 70 via corresponding locking elements of the bearing coupler 68 and the housing 70. For example, the locking elements may interlock with one another via rotation of the bearing coupler 68 relative to the housing, thereby coupling the bearing coupler 68 to the housing 70. While the bearing coupler 68 is coupled to the housing 70, the shaft of the bearing coupler 68 rotatably supports the meter roller 28 and secures the meter roller to the housing 70. While the debris removal system 67 is described above with reference to a metering system having a removal cartridge, in other embodiments, the debris removal system 67, which includes air passages extending through a housing and/or air passages 69 extending through a body of the meter roller 28, may be utilized with other suitable types of metering systems (e.g., metering systems with a meter roller directly mounted within a respective housing, etc.).

Figure 8:
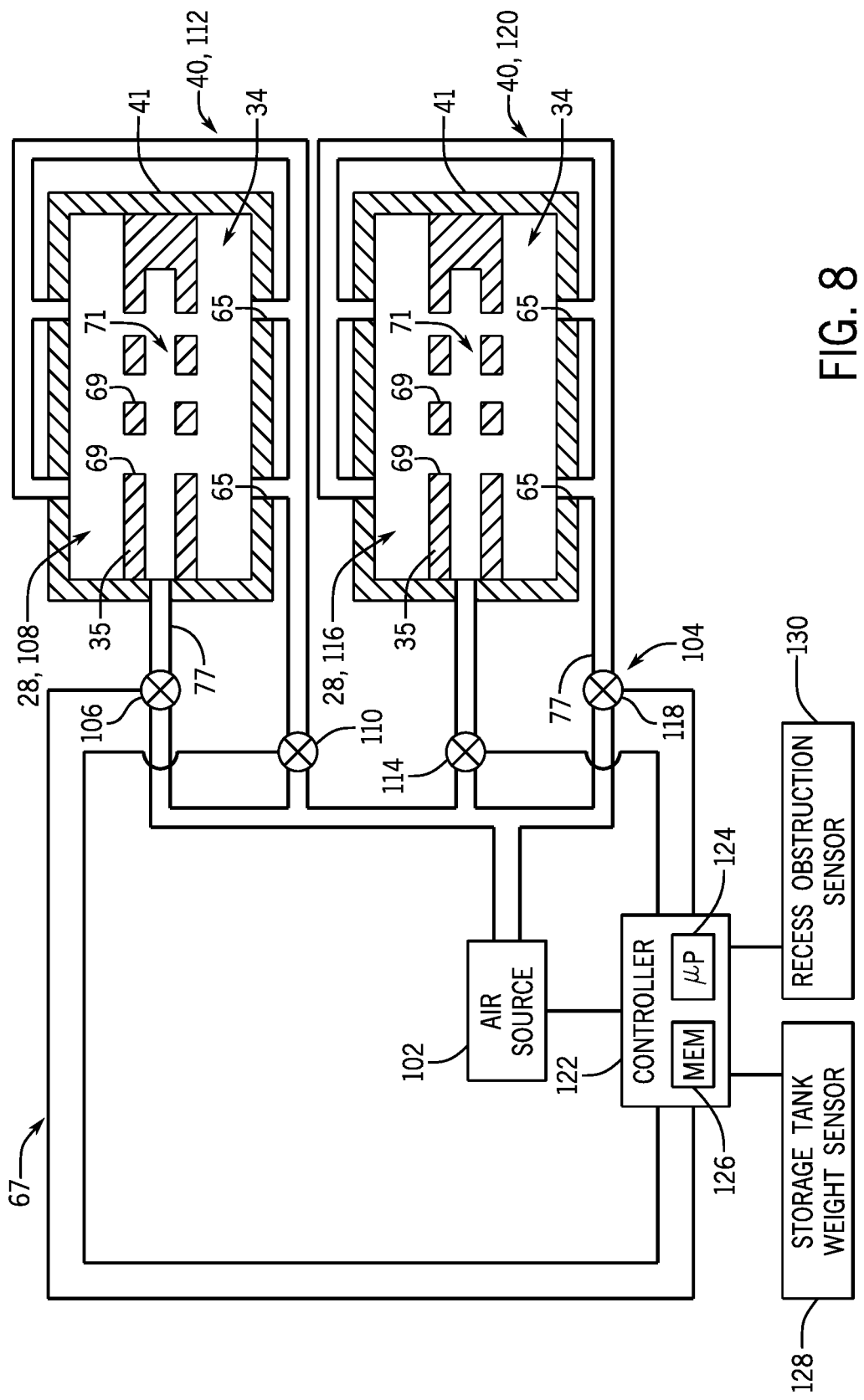
FIG. 8 is a schematic view of an embodiment of a debris removal system that may be employed within the metering system of FIG. 3.

FIG. 8 is a schematic view of an embodiment of a debris removal system 67 that may be employed within the metering system of FIG. 3. In the illustrated embodiment, the debris removal system 67 includes air passages 65 extending through the housing 41 of each meter box 40, in which the air passages 65 are directed toward recesses 34 of the respective meter roller 28. In addition, the debris removal system 67 includes air passages 69 extending through the body 35 of each meter roller 28, in which the air passages 69 are directed toward the recesses 34 of the meter roller 28. Each air passage is configured to flow air into a respective/corresponding recess to remove accumulated debris within the recess, thereby enabling the meter roller to accurately meter the flowable particulate material. As previously discussed, the debris removal system may include more or fewer air passages extending through the body of each meter roller, more or fewer air passages extending through the housing of each meter box, other/additional air passage(s) extending through another suitable housing, or a combination thereof. Furthermore, while the illustrated debris removal system is configured to remove debris from the recesses of two meter rollers, in other embodiments, the debris removal system may be configured to remove debris from the recesses of more or fewer meter rollers.

In the illustrated embodiment, the debris removal system 67 includes an air source 102 configured to provide the airflow to the air passages. The air source may include a fan, a blower, an air storage tank, or a combination thereof. In certain embodiments, the air source may be configured to provide an airflow to other elements of the agricultural system, such as the storage tank. For example, the air source may correspond to the primary air source of the air cart (e.g., which provides the airflow to conduits that convey the particulate material to the row units). In addition, the debris removal system 67 includes a valve assembly 104 fluidly coupled to the air source 102 and to the air passages. The valve assembly 104 is configured to control the airflow through the air passages. In the illustrated embodiment, the valve assembly 104 includes a first valve 106 fluidly coupled to the inlet 77, which is fluidly coupled to the central cavity 71 of a first meter roller 108, and a second valve 110 fluidly coupled to the air passages 65 extending through the housing 41 of a first meter box 112. The valve assembly 104 also includes a third valve 114 fluidly coupled to the inlet 77, which is fluidly coupled to the central cavity 71 of a second meter roller 116, and a fourth valve 118 fluidly coupled to the air passages 65 extending through the housing 41 of a second meter box 120.

While the valve assembly 104 includes four valves in the illustrated embodiment, in other embodiments, the valve assembly may include more or fewer valves. For example, in certain embodiments, with regard to at least one meter roller/meter box, the valve assembly may include a single valve to control airflow to the air passages extending through the meter box housing and the air passages extending through the meter roller body. Furthermore, in certain embodiments, the valve assembly may include a single valve to control airflow to all of the air passages of the debris removal system. In addition, in certain embodiments, the valve assembly may include multiple valves to control airflow to the air passages extending through a meter roller body, and/or the valve assembly may include multiple valves to control airflow to the air passages extending through a meter box housing. Each valve is configured to selectively facilitate the flow of air to the respective air passage(s). Furthermore, in certain embodiments, at least one valve (e.g., all of the valves of the valve assembly, a portion of the valves of the valve assembly, etc.) may control the flow rate of the airflow to the respective air passage(s).

In the illustrated embodiment, the valve assembly 104 (e.g., each valve of the valve assembly) is communicatively coupled to a controller 122. The controller 122 is configured to output one or more output signals to the valve assembly 104 indicative of instructions to selectively provide the airflow to the air passages/certain air passage(s). In certain embodiments, the controller 122 is an electronic controller having electrical circuitry configured to control the valve assembly 104. In the illustrated embodiment, the controller 122 includes a processor, such as the illustrated microprocessor 124, and a memory device 126. The controller 122 may also include one or more storage devices and/or other suitable components. The processor 124 may be used to execute software, such as software for controlling the valve assembly, and so forth. Moreover, the processor 124 may include multiple microprocessors, one or more "general-purpose" microprocessors, one or more special-purpose microprocessors, and/or one or more application specific integrated circuits (ASICS), or some combination thereof. For example, the processor 124 may include one or more reduced instruction set (RISC) processors.

The memory device 126 may include a volatile memory, such as random access memory (RAM), and/or a nonvolatile memory, such as read-only memory (ROM). The memory device 126 may store a variety of information and may be used for various purposes. For example, the memory device 126 may store processor-executable instructions (e.g., firmware or software) for the processor 124 to execute, such as instructions for controlling the valve assembly, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the valve assembly, etc.), and any other suitable data.

In certain embodiments, the controller 122 is configured to periodically instruct each valve of the valve assembly to facilitate flow to respective air passages. For example, the controller 122 may instruct the first valve 106 to open for a pulse duration, while the second, third, and fourth valves remain closed. The controller 122 may then instruct the first valve 106 to close and the second valve 110 to open for a pulse duration, while the third and fourth valves remain closed. This process may continue until all valves are cycled (e.g., opened and closed), and then the process may repeat. The controller 122 may instruct each valve to open for any suitable pulse duration. For example, in certain embodiments, the pulse duration may be less than 20 seconds, less than 15 seconds, less than 10 seconds, less than 5 seconds, or any other suitable duration. Furthermore, the pulse duration may be between about 0.5 second and about 20 seconds, between about 1 second and about 10 seconds, or between about 1 second and about 2 seconds. While the controller is configured to cycle each valve individually in the illustrated embodiment, in other embodiments, the controller may cycle multiple valves concurrently. For example, the controller may cycle the first and second valves concurrently, and the controller may cycle the third and fourth valves concurrently.

Furthermore, the controller 122 may establish any suitable duration between cycling each valve (e.g., the delay between cycling the first valve and cycling the second valve) and/or between valve cycling processes (e.g., the delay between cycling all of the valves a first time and cycling all of the valves a second time). For example, the duration between valve cycles may be about 0 seconds, about 0.5 seconds, about 1 second, about 5 seconds, about 30 seconds, or any other suitable duration. Furthermore, in certain embodiments, the cycling of multiple valves may overlap. For example, the controller may instruct the first valve to open for 10 seconds, and then instruct the second valve to open for 10 seconds 5 seconds after the first valve is instructed to open. The pulse duration and/or the duration between valve cycles may be constant through each valve cycling process or may vary within the valve cycling process. In addition, the duration between valve cycling processes may be about 30 seconds, about 1 min, about 2 minutes, about 3 minutes, about 4 minutes, or any other suitable duration. In certain embodiments, the pulse duration, the duration between valve cycles, the duration between valve cycling processes, or a combination thereof, may be based on the rate at which agricultural product is metered from the meter roller(s). For example, if the first meter roller 108 is rotating twice as fast as the second meter roller 116, the controller may instruct the first and second valves to open twice as often as the third and fourth valves.

In the illustrated embodiment, the air source 102 is communicatively coupled to the controller 122. The controller 122 is configured to output a second output signal to the air source 102 indicative of instructions to control a flow rate of the airflow. For example, the controller may adjust the flow rate based on the type of particulate material being dispensed (e.g., a higher flow rate for particulate material that is more likely to clump together, a lower flow rate for particulate material that is less likely to clump together, etc.). Furthermore, in certain embodiments, the controller may control the flow rate by controlling the valves of the valve assembly (e.g., alone or in addition to controlling the air source). In other embodiments, the controller may not be communicatively coupled to the air source (e.g., the flow rate of the air from the air source may not be controllable). While the air source is configured to provide a flow of air in the illustrated embodiment, in other embodiments, another suitable source may provide a flow of another suitable fluid (e.g., nitrogen, water, etc.) to facilitate debris removal from the meter roller recesses.

In the illustrated embodiment, the debris removal system includes a storage tank weight sensor 128 communicatively coupled to the controller 122. The storage tank weight sensor 128 (e.g., including multiple sensor elements) may be positioned between the storage tank of the air cart and the frame of the air cart, and the storage tank weight sensor 128 may include one or more load cells, one or more strain gauges, other suitable weight measuring device(s), or a combination thereof. The storage tank weight sensor 128 is configured to output a signal (e.g., a first input signal) indicative of a weight of the flowable particulate material within the storage tank. The controller 122 is configured to receive the signal and determine a difference between the weight of the particulate material within the storage tank and an expected weight. The controller may determine the expected weight based on the number of rotations of each meter roller and the weight of product output by each meter roller rotation (e.g., which may be determined during a calibration process). A significant difference between the measured weight and the expected weight of the particulate material may indicate that the accuracy of at least one meter roller is reduced due to accumulate of debris (e.g., dust, dirt, particulate material, etc.) within one or more recesses of the meter roller. Accordingly, the controller is configured to output the output signal indicative of instructions to selectively open one or more valves (e.g., initiate a valve cycling process) in response to determining that a difference between the measured weight and the expected weight is greater than a threshold value (e.g., 1 percent of the weight of the flowable particulate material within the storage tank, 2 percent of the weight of the flowable particulate material within the storage tank, etc.).

In the illustrated embodiment, the debris removal system includes a recess obstruction sensor 130 communicatively coupled to the controller 122. A recess obstruction sensor 130 (e.g., including multiple sensor elements) may be positioned within the metering cavity of at least one meter box, and the recess obstruction sensor 130 may include optical sensor(s) (e.g., camera(s), etc.), infrared sensor(s), ultrasonic sensor(s), capacitance sensor(s), other suitable sensor(s), or a combination thereof. The recess obstruction sensor 130 is configured to output a signal (e.g., a second input signal) indicative of an obstruction within at least one of the recesses of a respective meter roller. The controller 122 is configured to receive the signal indicative of the obstruction and to identify the obstruction based on the signal. The controller is also configured to output the output signal indicative of instructions to selectively open one or more valves (e.g., initiate a valve cycling process) in response to identifying the obstruction. For example, if the controller 122 identifies that one or more recesses 34 of the first meter roller 108 are obstructed, the controller 122 may output the output signal to the first valve 106 and/or the second valve 108 indicative of instructions to facilitate airflow from the air source 102 to the air passages. In certain embodiments, the controller may also adjust the flow rate of the air from the air source, the flow rate of the air through the valve(s), the pulse duration, the duration between valve cycles, the duration between valve cycling processes, or a combination thereof, based on a detected severity (e.g., size, number of blocked recesses, etc.) of the obstruction. While the debris removal system includes the storage tank weight sensor 128 and the recess obstruction sensor 130 in the illustrated embodiment, in other embodiments, at least one of the sensors may be omitted (e.g., both sensors may be omitted).

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . ." or "step for [perform]ing [a function] . . .", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A meter roller for an agricultural metering system, comprising:
   a plurality of flutes and a corresponding plurality of recesses, wherein the plurality of flutes and the corresponding plurality of recesses are configured to meter flowable particulate material from a storage tank to a material distribution system via rotation of the meter roller; and
   a plurality of air passages formed within a body of the meter roller, wherein each air passage of the plurality of air passages is fluidly coupled to a central cavity of the meter roller and extends to a respective recess of the plurality of recesses, and each air passage of the plurality of air passages is configured to flow air from the central cavity into the respective recess;
   wherein the plurality of air passages comprises a first set of air passages extending to a first recess of the plurality of recesses and a second set of air passages extending to a second recess of the plurality of recesses; and
   wherein the first set of air passages are distributed along a rotational axis of the meter roller, or the second set of air passages are distributed along the rotational axis of the meter roller, or a combination thereof.

2. The meter roller of claim 1, wherein at least one air passage of the plurality of air passages extends to a base of a respective recess of the plurality of recesses.

3. The meter roller of claim 1, comprising an inlet fluidly coupled to the central cavity and configured to flow the air into the central cavity.

4. The meter roller of claim 3, wherein the inlet is substantially coaxial with a rotational axis of the meter roller.

5. A debris removal system for an agricultural metering system, comprising:
   at least one air passage extending to a metering cavity of the agricultural metering system, wherein the at least one air passage is directed toward a recess of a meter roller disposed within the metering cavity and configured to meter flowable particulate material from a storage tank to a material distribution system via rotation of the meter roller;
   a valve assembly fluidly coupled to the at least one air passage, wherein the valve assembly is configured to control an airflow through the at least one air passage; and
   a controller comprising a processor and a memory, wherein the controller is communicatively coupled to the valve assembly, the controller is configured to output an output signal to the valve assembly indicative of instructions to selectively provide the airflow to the at least one air passage, and the controller is configured to:
      receive a first input signal indicative of a weight of the flowable particulate material within the storage tank and instruct the valve assembly, via the output signal, to provide the airflow to the at least one air passage in response to determining that a difference between the weight and an expected weight is greater than a threshold value; or
      receive a second input signal indicative of an obstruction within the recess of the meter roller and instruct the valve assembly, via the output signal, to provide the airflow to the at least one air passage in response to identifying the obstruction within the recess; or
      a combination thereof.

6. The debris removal system of claim 5, comprising an air source fluidly coupled to the valve assembly and communicatively coupled to the controller, wherein the air source is configured to provide the airflow to the valve assembly, and the controller is configured to output a second output signal to the air source indicative of instructions to control a flow rate of the airflow.

7. The debris removal system of claim 5, wherein the at least one air passage extends through a housing of the agricultural metering system and is directed toward the recess of the meter roller.

8. The debris removal system of claim 5, wherein the at least one air passage extends through a body of the meter roller and is directed toward the recess of the meter roller.

9. An agricultural metering system, comprising:
   a housing having a metering cavity;
   a meter roller disposed within the metering cavity of the housing, wherein the meter roller comprises a plurality of flutes and a corresponding plurality of recesses, and the plurality of flutes and the corresponding plurality of recesses are configured to meter flowable particulate material from a storage tank to a material distribution system via rotation of the meter roller; and
   a debris removal system comprising a plurality of air passages, wherein each air passage of the plurality of air passages extends through a body of the meter roller from a central cavity of the meter roller to a respective recess of the plurality of recesses of the meter roller, and the plurality of air passages is configured to flow air from the central cavity into the plurality of recesses;
   wherein the debris removal system comprises an air source configured to provide the flow of the air to the central cavity to enable the flow of the air to pass through the plurality of air passages concurrently from the central cavity into the plurality of recesses.

10. The agricultural metering system of claim 9, wherein the debris removal system comprises:
    a valve assembly fluidly coupled to the central cavity, wherein the valve assembly is configured to control the flow of the air through the plurality of air passages; and
    a controller comprising a processor and a memory, wherein the controller is communicatively coupled to the valve assembly, and the controller is configured to output an output signal to the valve assembly indicative of instructions to selectively provide the flow of the air to the passage plurality of air passages.

11. The agricultural metering system of claim 10, wherein the air source is fluidly coupled to the valve assembly and communicatively coupled to the controller, wherein the air source is configured to provide the flow of the air to the valve assembly, and the controller is configured to output a second output signal to the air source indicative of instructions to control a flow rate of the flow of the air.

12. The agricultural metering system of claim 10, wherein the controller is configured to receive a first input signal indicative of a weight of the flowable particulate material within the storage tank, and the controller is configured to instruct the valve assembly, via the output signal, to provide the flow of the air to the plurality of air passages in response to determining that a difference between the weight and an expected weight is greater than a threshold value.

13. The agricultural metering system of claim 10, wherein the controller is configured to receive a second input signal indicative of an obstruction within at least one recess of the plurality of recesses of the meter roller, and the controller is configured to instruct the valve assembly, via the output signal, to provide the flow of the air to the plurality of air passages in response to identifying the obstruction.

\* \* \* \* \*